Dec. 12, 1933.                P. J. OSBORNE                1,939,273
                               VEHICLE WINDOW
                             Filed Aug. 5, 1931
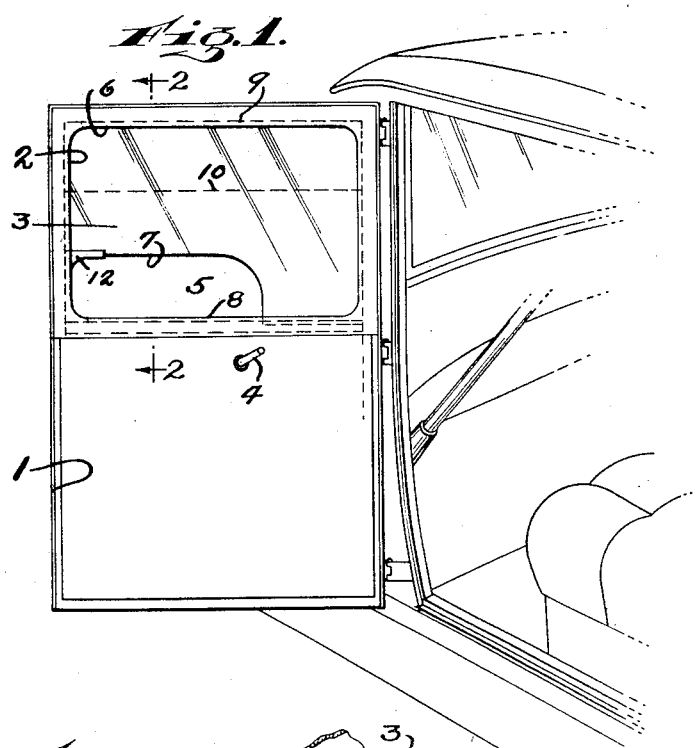
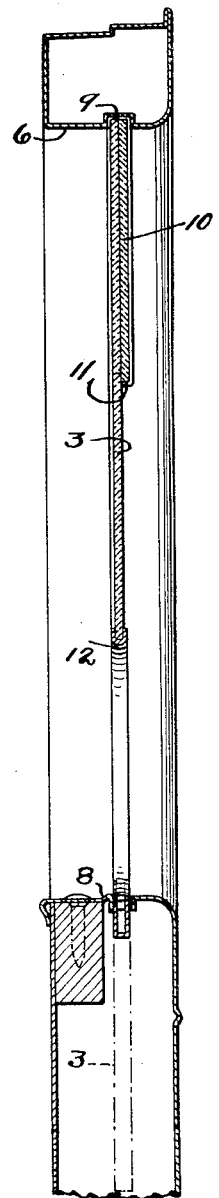
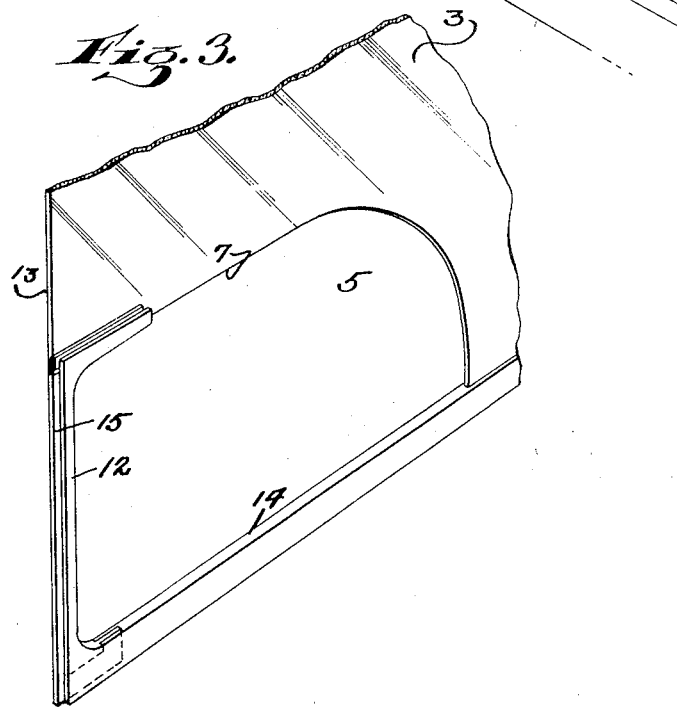
INVENTOR.
Paul J. Osborne.
BY
Kiddle, Margeson and Varnidge.
ATTORNEYS.

Patented Dec. 12, 1933

1,939,273

UNITED STATES PATENT OFFICE 1,939,273

VEHICLE WINDOW

Paul J. Osborne, Ozone Park, N. Y.

Application August 5, 1931. Serial No. 555,236

2 Claims. (Cl. 296—44)

This invention relates to an improvement in vehicle windows and provides a construction highly desirable for vehicles of the character of automobiles, the invention, however, having other and various uses as will be apparent to those skilled in the art.

One of the objects of my invention is the provision of a vehicle window opening in which the glass or window closure is provided with an opening for the insertion of the arm of the driver for signalling purposes, means being provided, however, which permits the window closure or glass to be lowered so as to entirely close the opening therein without, however, permitting air to enter above the upper edge of the closure and without the use of an additional window closure. In other words, the present construction provides an arrangement whereby the use of two windows which may be raised and lowered as desired and one of which is equipped with an opening is eliminated.

A further object of my invention is the provision of a construction of the general character indicated, wherein the opening in the window closure or glass is equipped with a clip which may be integral with the frame or sash of the glass or secured thereto, this clip providing a support and reinforcement for the glass to eliminate breaking of the same and functioning as a guide for the glass to facilitate raising and lowering of the same.

In the drawing accompanying this application:

Fig. 1 is an elevational view showing the driver's door of an automobile equipped with my invention;

Fig. 2 is a section on the line 2—2 of Fig. 1; and

Fig. 3 is a fragmentary view illustrating on a somewhat enlarged scale with respect to Fig. 1 certain details of the invention.

Referring to the drawing in detail, 1 designates the door of a vehicle provided with a window opening 2. The window opening is equipped with a closure or window 3 adapted to be raised and lowered in the usual fashion by a handle 4.

The lower part of the closure or window 3 is cut away to provide an opening 5 therein which is of such depth that when the glass is raised to its uppermost position as shown in Fig. 1 there is ample room for the driver of the vehicle to extend an arm through the opening for signalling purposes. With the window in its uppermost position the upper edge 9 thereof will lie above the upper edge 6 of the window opening so that the entry of air over the top of the window is prevented.

It is desirable at times, however, to close the opening 5 in the window, which is conveniently done by lowering the window until the upper edge 7 of the opening 5 comes below the window sill 8. With the window in this position the upper edge 9 thereof will of course be some distance below the upper edge 6 of the window opening. Accordingly at the top of the window opening and extending entirely across the same I provide a baffle plate 10, this plate which is fixed in the door lies parallel to the window and is of sufficient depth so that when the window 3 is lowered to position where the upper edge 7 of the opening 5 is below the window sill 8 the upper edge 9 of the window will extend slightly above or at least not fall below the lower edge 11 of the baffle 10. Inasmuch as the window and the baffle are parallel and lie close to each other, in fact may contact, it will be appreciated that entry of air to the vehicle over the top of the window 3 is effectually prevented.

This construction, therefore, provides an arrangement whereby by the use of a single window and the baffle 10 the opening 5 in the window is made available for use when desired or necessary, and may be closed to exclude air from the interior of the vehicle without admitting air over the top of the window and without the necessity of employing a double window.

As has been mentioned above, one of the objects of this invention is to provide a structure comprising a window with an opening therethrough in which the window is not detrimentally weakened due to the provision of this opening and raising and lowering of the window facilitated. To this end and with reference particularly to Fig. 3 it will be seen that the edge of the window at the outer end of the opening 5 is provided with a clip 12 of metal, wood or other suitable material. This clip extends inwardly of the glass 3 so as to receive the upper edge 7 of the opening 5, and downwardly in line with the side 13 of the window and then inwardly to join the window frame 14 at the lower edge of the window, this frame 14, as will be understood, being of usual construction and having attached to it the mechanism operative by the handle 4 required for raising and lowering the window. It is to be understood, that if desired, the clip and frame or sash 14 may be integral with each other. The clip is provided with an outwardly extending rib 15 along its vertical side which rides in the channel in the door which receives the edge 13 of the window so that the clip acts as a guide for the window. The provision of this clip as will be appreciated provides a support for the glass 3 extending inwardly beneath the edge 7 of the cutout or opening 5 and downwardly to the sash 14, so that the window is supported as well as it would be were the opening 5 omitted entirely.

What I claim is:

1. A vertically slidable window for vehicles comprising a vertically slidable transparent panel the sides of which guide the panel in its vertical movement in the vehicle, said panel being cut away along the bottom and one side to provide a signalling opening adjacent one corner of the panel, a sash for receiving said transparent panel along the bottom edge of the panel, a clip secured to said sash extending upwardly therefrom in line with the side of the panel at the cut-out portion and inwardly along the bottom of the panel at the top of the cut-out portion of the panel, said clip and sash supporting the panel along its bottom edge and at the top of the cut-out portion, and constituting the sole support of the panel, a baffle plate at the top of the said panel offset with respect thereto to permit of raising and lowering of the panel to open and close said signalling opening, said baffle plate being a depth not less than the depth of said opening, so that said panel may be lowered to close off the signalling opening without lowering the upper edge of the panel below said baffle.

2. A clip for application to unframed vertically movable window panels of the type provided with a signalling opening along the bottom and one side of the panel, said clip comprising a laterally extending portion adapted to lie along the bottom of the panel at the top of the signalling opening, and a portion extending at right angles thereto in line with the edge of the panel for attachment to the sash of the panel, and to provide a guide for the edge of the panel removed in providing the signalling opening.

PAUL J. OSBORNE.